United States Patent
Calvin et al.

(10) Patent No.: US 10,848,012 B2
(45) Date of Patent: Nov. 24, 2020

(54) ELECTROMAGNETIC CONNECTORS FOR AN INDUSTRIAL CONTROL SYSTEM

(71) Applicant: Bedrock Automation Platforms Inc., San Jose, CA (US)

(72) Inventors: James G. Calvin, Attleboro, MA (US); Albert Rooyakkers, Sunnyvale, CA (US); Michael Koran, Norton, MA (US)

(73) Assignee: BEDROCK AUTOMATION PLATFORMS INC., San Jose, CA (US)

( * ) Notice: Subject to any disclaimer, the term of this patent is extended or adjusted under 35 U.S.C. 154(b) by 0 days.

(21) Appl. No.: 15/838,857

(22) Filed: Dec. 12, 2017

(65) Prior Publication Data
US 2018/0166930 A1    Jun. 14, 2018

Related U.S. Application Data

(63) Continuation of application No. 15/248,006, filed on Aug. 26, 2016, now Pat. No. 9,847,681, which is a
(Continued)

(51) Int. Cl.
*H02J 17/00* (2006.01)
*H02J 50/80* (2016.01)
(Continued)

(52) U.S. Cl.
CPC .............. *H02J 50/80* (2016.02); *H01F 38/14* (2013.01); *H01R 13/6205* (2013.01);
(Continued)

(58) Field of Classification Search
CPC .. H02J 5/005; H02J 50/10; H02J 50/40; H02J 50/80; H04B 5/0031; H04B 5/0087; H01R 13/6205
See application file for complete search history.

(56) References Cited

U.S. PATENT DOCUMENTS 1,778,549 A   10/1930  Conner
1,961,013 A    5/1934  Saraceno
(Continued)

FOREIGN PATENT DOCUMENTS

CN         2162746 Y    4/1994
CN         1408129 A    4/2003
(Continued)

OTHER PUBLICATIONS

International Search Report dated Apr. 29, 2013 for PCT/US2012/072056.
(Continued)

*Primary Examiner* — Jeffrey A Gblende
*Assistant Examiner* — Jye-June Lee
(74) *Attorney, Agent, or Firm* — Kevin E. West; Advent, LLP

(57) ABSTRACT

An electromagnetic connector is disclosed that is configured to form a first magnetic circuit portion comprising multiple coils disposed about a first core member. The electromagnetic connector is configured to mate with a second electromagnetic connector that is configured to form a second magnetic circuit portion comprising a coil disposed about a second core member. When the electromagnetic connector is mated with the second electromagnetic connector, the first core member and the second core member are configured to couple the multiple coils of the electromagnetic connector to the coil of the second electromagnetic connector with a magnetic circuit formed from the first magnetic circuit portion and the second magnetic circuit portion. The magnetic circuit is configured to induce a signal in a first coil of the multiple coils and the coil of the second electromagnetic connector when a second coil of the multiple coils is energized.

18 Claims, 6 Drawing Sheets

Related U.S. Application Data continuation of application No. 13/959,888, filed on Aug. 6, 2013, now Pat. No. 9,437,967, which is a continuation-in-part of application No. 13/875,858, filed on May 2, 2013, now Pat. No. 9,449,756, and a continuation-in-part of application No. 13/341,176, filed on Dec. 30, 2011, now Pat. No. 8,868,813, and a continuation-in-part of application No. 13/341,161, filed on Dec. 30, 2011, now Pat. No. 8,862,802, and a continuation-in-part of application No. 13/341,143, filed on Dec. 30, 2011, now Pat. No. 8,971,072, and a continuation-in-part of application No. PCT/US2012/072056, filed on Dec. 28, 2012.

(51) Int. Cl.
  *H01R 13/62* (2006.01)
  *H04B 5/00* (2006.01)
  *H02J 50/10* (2016.01)
  *H01F 38/14* (2006.01)

(52) U.S. Cl.
  CPC ............ *H02J 50/10* (2016.02); *H04B 5/0031* (2013.01); *H04B 5/0087* (2013.01); *H01F 2038/143* (2013.01)

(56) References Cited

U.S. PATENT DOCUMENTS

| | | | |
|---|---|---|---|
| 2,540,575 A | 2/1951 | Finizie | |
| 3,702,983 A | 11/1972 | Chace et al. | |
| 4,079,440 A | 3/1978 | Ohnuma et al. | |
| 4,082,984 A | 4/1978 | Iwata | |
| 4,337,499 A | 6/1982 | Cronin et al. | |
| 4,403,286 A | 9/1983 | Fry et al. | |
| 4,508,414 A | 4/1985 | Kusui et al. | |
| 4,628,308 A | 12/1986 | Robert | |
| 4,656,622 A | 4/1987 | Lea | |
| 4,672,529 A | 6/1987 | Kupersmit | |
| 4,691,384 A | 9/1987 | Jobe | |
| 4,882,702 A | 11/1989 | Struger et al. | |
| 4,929,939 A | 5/1990 | Varma et al. | |
| 4,932,892 A | 6/1990 | Hatch | |
| 5,013,247 A | 5/1991 | Watson | |
| 5,229,652 A | 7/1993 | Hough | |
| 5,325,046 A | 6/1994 | Young et al. | |
| 5,378,166 A | 1/1995 | Gallagher, Sr. | |
| 5,385,487 A | 1/1995 | Beitman | |
| 5,385,490 A | 1/1995 | Demeter et al. | |
| 5,388,099 A | 2/1995 | Poole | |
| 5,422,558 A | 6/1995 | Stewart | |
| 5,469,334 A | 11/1995 | Balakrishnan | |
| 5,519,583 A | 5/1996 | Kolling et al. | |
| 5,546,463 A | 8/1996 | Caputo et al. | |
| 5,590,284 A | 12/1996 | Crosetto | |
| 5,602,754 A | 2/1997 | Beatty et al. | |
| 5,603,044 A | 2/1997 | Annapareddy et al. | |
| 5,719,483 A | 2/1998 | Abbott et al. | |
| 5,724,349 A | 3/1998 | Cloonan et al. | |
| 5,735,707 A | 4/1998 | O' Groske et al. | |
| 5,773,962 A | 6/1998 | Nor | |
| 5,860,824 A | 1/1999 | Fan | |
| 5,896,473 A | 4/1999 | Kaspari | |
| 5,909,368 A | 6/1999 | Nixon et al. | |
| 5,951,666 A | 9/1999 | Ilting et al. | |
| 5,958,030 A | 9/1999 | Kwa | |
| 5,963,448 A | 10/1999 | Flood et al. | |
| 5,980,312 A | 11/1999 | Chapman et al. | |
| 6,009,410 A | 12/1999 | LeMole et al. | |
| 6,046,513 A * | 4/2000 | Jouper et al. | H02J 1/14 307/31 |
| 6,124,778 A | 9/2000 | Rowley et al. | |
| 6,178,474 B1 | 1/2001 | Hamano et al. | |
| 6,219,789 B1 | 4/2001 | Little et al. | |
| 6,220,889 B1 | 4/2001 | Ely et al. | |
| 6,347,963 B1 | 2/2002 | Falkenberg et al. | |
| 6,393,565 B1 | 5/2002 | Lockhart et al. | |
| 6,435,409 B1 | 8/2002 | Hu | |
| 6,453,416 B1 | 9/2002 | Epstein | |
| 6,480,963 B1 | 11/2002 | Tachibana et al. | |
| 6,490,176 B2 | 12/2002 | Holzer et al. | |
| 6,574,681 B1 | 6/2003 | White et al. | |
| 6,597,683 B1 | 7/2003 | Gehring et al. | |
| 6,643,777 B1 | 11/2003 | Chu | |
| 6,680,904 B1 | 1/2004 | Kaplan et al. | |
| 6,695,620 B1 | 2/2004 | Huang | |
| 6,799,234 B1 | 9/2004 | Moon et al. | |
| 6,812,803 B2 | 11/2004 | Goergen | |
| 6,814,580 B2 | 11/2004 | Li et al. | |
| 6,828,894 B1 | 12/2004 | Sorger et al. | |
| 6,840,795 B1 | 1/2005 | Takeda et al. | |
| 6,988,162 B2 | 1/2006 | Goergen | |
| 7,164,255 B2 | 1/2007 | Hui | |
| 7,172,428 B2 | 2/2007 | Huang | |
| 7,200,692 B2 | 4/2007 | Singla et al. | |
| 7,234,963 B1 | 6/2007 | Huang | |
| 7,254,452 B2 | 8/2007 | Davlin et al. | |
| 7,402,074 B2 | 7/2008 | LeBlanc et al. | |
| 7,415,368 B2 | 8/2008 | Gilbert et al. | |
| 7,426,585 B1 | 9/2008 | Rourke | |
| 7,460,482 B2 | 12/2008 | Pike | |
| 7,510,420 B2 | 3/2009 | Mori | |
| 7,526,676 B2 | 4/2009 | Chou et al. | |
| 7,529,862 B2 | 5/2009 | Isani et al. | |
| 7,536,548 B1 | 5/2009 | Batke et al. | |
| 7,554,288 B2 | 6/2009 | Gangstoe et al. | |
| 7,587,481 B1 | 9/2009 | Osburn, III | |
| 7,614,909 B2 | 11/2009 | Lin | |
| 7,619,386 B2 | 11/2009 | Sasaki et al. | |
| 7,622,994 B2 | 11/2009 | Galal | |
| 7,660,998 B2 | 2/2010 | Walmsley | |
| 7,670,190 B2 | 3/2010 | Shi et al. | |
| 7,685,349 B2 | 3/2010 | Allen et al. | |
| 7,730,304 B2 | 6/2010 | Katsube et al. | |
| 7,746,846 B2 | 6/2010 | Boora et al. | |
| 7,790,304 B2 | 6/2010 | Katsube et al. | |
| 7,761,640 B2 | 7/2010 | Hikabe | |
| 7,774,074 B2 | 8/2010 | Davlin et al. | |
| 7,811,136 B1 | 10/2010 | Hsieh et al. | |
| 7,815,471 B2 | 10/2010 | Wu | |
| 7,822,994 B2 | 10/2010 | Hamaguchi | |
| 7,839,025 B2 | 11/2010 | Besser et al. | |
| 7,872,561 B2 | 1/2011 | Matumoto | |
| 7,948,758 B2 | 5/2011 | Buhler et al. | |
| 7,960,870 B2 | 6/2011 | Besser et al. | |
| 7,971,052 B2 | 6/2011 | Lucas et al. | |
| 8,013,474 B2 | 9/2011 | Besser et al. | |
| 8,019,194 B2 | 9/2011 | Morrison et al. | |
| 8,032,745 B2 | 10/2011 | Bandholz et al. | |
| 8,062,070 B2 | 11/2011 | Jeon et al. | |
| 8,125,208 B2 | 2/2012 | Gyland | |
| 8,132,231 B2 | 3/2012 | Amies et al. | |
| 8,143,858 B2 | 3/2012 | Tsugawa et al. | |
| 8,149,587 B2 | 4/2012 | Baran et al. | |
| 8,157,569 B1 | 4/2012 | Liu | |
| 8,181,262 B2 | 5/2012 | Cooper et al. | |
| 8,189,101 B2 | 5/2012 | Cummings et al. | |
| 8,212,399 B2 | 7/2012 | Besser et al. | |
| 8,266,360 B2 | 9/2012 | Agrawal | |
| 8,281,386 B2 | 10/2012 | Milligan et al. | |
| 8,287,306 B2 | 10/2012 | Daugherty et al. | |
| 8,295,770 B2 | 10/2012 | Seil et al. | |
| 8,310,380 B2 | 11/2012 | Aria et al. | |
| 8,380,905 B2 | 2/2013 | Djabbari et al. | |
| 8,390,441 B2 | 3/2013 | Covaro et al. | |
| 8,465,762 B2 | 6/2013 | Lee et al. | |
| 8,480,438 B2 | 7/2013 | Mattson | |
| 8,560,147 B2 | 10/2013 | Taylor et al. | |
| 8,587,318 B2 | 11/2013 | Chandler et al. | |
| 8,651,874 B2 | 2/2014 | Ku et al. | |
| 8,677,145 B2 | 3/2014 | Maletsky et al. | |
| 8,694,770 B1 | 4/2014 | Osburn, III | |
| 8,777,671 B2 | 7/2014 | Huang | |

(56) References Cited

U.S. PATENT DOCUMENTS

| | | |
|---|---|---|
| 8,862,802 B2 | 10/2014 | Calvin et al. |
| 8,868,813 B2 | 10/2014 | Calvin et al. |
| 8,971,072 B2 | 3/2015 | Calvin et al. |
| 9,071,082 B2 | 6/2015 | Nishibayashi et al. |
| 9,318,917 B2 | 4/2016 | Kubota et al. |
| 9,436,641 B2 | 9/2016 | Calvin et al. |
| 9,465,762 B2 | 10/2016 | Calvin et al. |
| 9,467,297 B2 | 10/2016 | Clish et al. |
| 9,812,803 B2 | 11/2017 | Toyoda et al. |
| 10,103,875 B1 | 10/2018 | Roth et al. |
| 2002/0070835 A1 | 6/2002 | Dadafshar |
| 2002/0080828 A1 | 6/2002 | Ofek et al. |
| 2002/0080829 A1 | 6/2002 | Ofek et al. |
| 2002/0084698 A1 | 7/2002 | Kelly et al. |
| 2002/0086678 A1 | 7/2002 | Salokannel et al. |
| 2002/0095573 A1 | 7/2002 | O'Brien |
| 2002/0097031 A1 | 7/2002 | Cook et al. |
| 2002/0116619 A1 | 8/2002 | Maruyama et al. |
| 2002/0171525 A1 | 11/2002 | Kobayashi et al. |
| 2002/0182898 A1 | 12/2002 | Takahashi et al. |
| 2002/0189910 A1 | 12/2002 | Yano et al. |
| 2003/0005289 A1 | 1/2003 | Gougeon et al. |
| 2003/0040897 A1 | 2/2003 | Murphy et al. |
| 2003/0074489 A1 | 4/2003 | Steger et al. |
| 2003/0094855 A1 | 5/2003 | Lohr et al. |
| 2003/0105601 A1 | 6/2003 | Kobayashi et al. |
| 2003/0137277 A1 | 7/2003 | Mori et al. |
| 2003/0166397 A1 | 9/2003 | Aura |
| 2003/0202330 A1 | 10/2003 | Lopata et al. |
| 2003/0204756 A1 | 10/2003 | Ransom et al. |
| 2005/0001589 A1 | 1/2005 | Edington et al. |
| 2005/0019143 A1 | 1/2005 | Bishman |
| 2005/0091432 A1 | 4/2005 | Adams et al. |
| 2005/0102535 A1 | 5/2005 | Patrick et al. |
| 2005/0144437 A1 | 6/2005 | Ransom et al. |
| 2005/0144440 A1 | 6/2005 | Catherman et al. |
| 2005/0162019 A1 | 7/2005 | Masciarelli et al. |
| 2005/0182876 A1 | 8/2005 | Kim et al. |
| 2005/0189910 A1 | 9/2005 | Hui |
| 2005/0229004 A1 | 10/2005 | Callaghan |
| 2006/0015590 A1 | 1/2006 | Patil et al. |
| 2006/0020782 A1 | 1/2006 | Kakii |
| 2006/0108972 A1 | 5/2006 | Araya |
| 2006/0119315 A1 | 6/2006 | Sasaki et al. |
| 2006/0155990 A1 | 7/2006 | Katsube et al. |
| 2006/0156415 A1 | 7/2006 | Rubinstein et al. |
| 2007/0072442 A1 | 3/2007 | DiFonzo et al. |
| 2007/0076768 A1 | 4/2007 | Chiesa et al. |
| 2007/0123304 A1 | 5/2007 | Pattenden et al. |
| 2007/0123316 A1 | 5/2007 | Little |
| 2007/0143838 A1 | 6/2007 | Milligan et al. |
| 2007/0174524 A1 | 7/2007 | Kato et al. |
| 2007/0177298 A1 | 8/2007 | Jaatinen et al. |
| 2007/0194944 A1 | 8/2007 | Galera et al. |
| 2007/0214296 A1 | 9/2007 | Takamatsu et al. |
| 2007/0229302 A1* | 10/2007 | Penick ............... G05B 19/4185 340/13.24 |
| 2007/0260897 A1 | 11/2007 | Cochran et al. |
| 2008/0067874 A1* | 3/2008 | Tseng ................. H02J 7/025 307/104 |
| 2008/0077976 A1 | 3/2008 | Schulz |
| 2008/0123669 A1 | 5/2008 | Oliveti et al. |
| 2008/0140888 A1 | 6/2008 | Blair et al. |
| 2008/0181316 A1* | 7/2008 | Crawley ............... H04L 12/10 375/258 |
| 2008/0189441 A1 | 8/2008 | Jundt et al. |
| 2008/0194124 A1 | 8/2008 | Di Stefano |
| 2008/0303351 A1 | 12/2008 | Jansen et al. |
| 2009/0036164 A1 | 2/2009 | Rowley |
| 2009/0061678 A1 | 3/2009 | Minoo et al. |
| 2009/0066291 A1 | 3/2009 | Tien et al. |
| 2009/0083843 A1 | 3/2009 | Wilkinson, Jr. et al. |
| 2009/0091513 A1 | 4/2009 | Kuhn |
| 2009/0092248 A1 | 4/2009 | Rawson |
| 2009/0121704 A1 | 5/2009 | Shibahara |
| 2009/0204458 A1 | 8/2009 | Wiese et al. |
| 2009/0217043 A1 | 8/2009 | Metke et al. |
| 2009/0222885 A1 | 9/2009 | Batke et al. |
| 2009/0234998 A1 | 9/2009 | Kuo |
| 2009/0239468 A1 | 9/2009 | He et al. |
| 2009/0245245 A1 | 10/2009 | Malwankar et al. |
| 2009/0254655 A1 | 10/2009 | Kidwell et al. |
| 2009/0256717 A1 | 10/2009 | Iwai |
| 2009/0278509 A1 | 11/2009 | Boyles et al. |
| 2009/0287321 A1 | 11/2009 | Lucas et al. |
| 2009/0288732 A1 | 11/2009 | Gielen |
| 2010/0052428 A1 | 3/2010 | Imamura et al. |
| 2010/0066340 A1 | 3/2010 | Delforge |
| 2010/0082869 A1 | 4/2010 | Lloyd et al. |
| 2010/0122081 A1 | 5/2010 | Sato et al. |
| 2010/0148721 A1 | 6/2010 | Little |
| 2010/0149997 A1 | 6/2010 | Law et al. |
| 2010/0151816 A1 | 6/2010 | Besehanic et al. |
| 2010/0153751 A1 | 6/2010 | Tseng et al. |
| 2010/0197366 A1 | 8/2010 | Pattenden et al. |
| 2010/0197367 A1 | 8/2010 | Pattenden et al. |
| 2010/0233889 A1 | 9/2010 | Kiani et al. |
| 2010/0262312 A1 | 10/2010 | Kubota et al. |
| 2011/0010016 A1 | 1/2011 | Giroti |
| 2011/0066309 A1 | 3/2011 | Matsuoka et al. |
| 2011/0074349 A1 | 3/2011 | Ghovanloo |
| 2011/0080056 A1 | 4/2011 | Low et al. |
| 2011/0082621 A1 | 4/2011 | Berkobin et al. |
| 2011/0089900 A1 | 4/2011 | Hogari |
| 2011/0140538 A1 | 6/2011 | Jung et al. |
| 2011/0150431 A1 | 6/2011 | Klappert |
| 2011/0185196 A1 | 7/2011 | Asano et al. |
| 2011/0196997 A1 | 8/2011 | Ruberg et al. |
| 2011/0197009 A1 | 8/2011 | Agrawal |
| 2011/0202992 A1 | 8/2011 | Kiao et al. |
| 2011/0285847 A1 | 11/2011 | Riedel et al. |
| 2011/0291491 A1 | 12/2011 | Lemmens et al. |
| 2011/0296066 A1 | 12/2011 | Xia |
| 2011/0313547 A1 | 12/2011 | Hernandez et al. |
| 2012/0028498 A1 | 2/2012 | Na et al. |
| 2012/0046015 A1 | 2/2012 | Little |
| 2012/0053742 A1 | 3/2012 | Tsuda |
| 2012/0102334 A1 | 4/2012 | O'Loughlin et al. |
| 2012/0124373 A1 | 5/2012 | Dangoor et al. |
| 2012/0143586 A1 | 6/2012 | Vetter et al. |
| 2012/0159210 A1 | 6/2012 | Hosaka |
| 2012/0236769 A1 | 9/2012 | Powell et al. |
| 2012/0242459 A1 | 9/2012 | Lambert |
| 2012/0265361 A1 | 10/2012 | Billingsley et al. |
| 2012/0271576 A1 | 10/2012 | Kamel et al. |
| 2012/0274273 A1 | 11/2012 | Jacobs et al. |
| 2012/0282805 A1 | 11/2012 | Ku et al. |
| 2012/0284354 A1 | 11/2012 | Mukundan et al. |
| 2012/0284514 A1 | 11/2012 | Lambert |
| 2012/0295451 A1 | 11/2012 | Hyun-Jun et al. |
| 2012/0297101 A1 | 11/2012 | Neupartl et al. |
| 2012/0311071 A1 | 12/2012 | Karaffa et al. |
| 2012/0322513 A1 | 12/2012 | Pattenden et al. |
| 2012/0328094 A1 | 12/2012 | Pattenden et al. |
| 2013/0011719 A1 | 1/2013 | Yasui et al. |
| 2013/0026973 A1 | 1/2013 | Luke et al. |
| 2013/0031237 A1 | 1/2013 | Jau et al. |
| 2013/0070788 A1 | 3/2013 | Deiretsbacher et al. |
| 2013/0170258 A1 | 7/2013 | Calvin et al. |
| 2013/0173832 A1 | 7/2013 | Calvin et al. |
| 2013/0211547 A1 | 8/2013 | Buchdunger et al. |
| 2013/0212390 A1 | 8/2013 | Du et al. |
| 2013/0224048 A1 | 8/2013 | Gillingwater et al. |
| 2013/0233924 A1 | 9/2013 | Burns |
| 2013/0244062 A1 | 9/2013 | Teramoto et al. |
| 2013/0290706 A1 | 10/2013 | Socky et al. |
| 2013/0291085 A1 | 10/2013 | Chong et al. |
| 2014/0015488 A1 | 1/2014 | Despesse |
| 2014/0068712 A1 | 3/2014 | Frenkel et al. |
| 2014/0075186 A1 | 3/2014 | Austen |
| 2014/0091623 A1 | 4/2014 | Shippy et al. |
| 2014/0095867 A1 | 4/2014 | Smith et al. |
| 2014/0097672 A1 | 4/2014 | Takemura et al. |
| 2014/0129162 A1 | 5/2014 | Hallman et al. |

(56) References Cited

U.S. PATENT DOCUMENTS

| | | | |
|---|---|---|---|
| 2014/0131450 A1 | 5/2014 | Gordon et al. |
| 2014/0142725 A1 | 5/2014 | Boyd |
| 2014/0280520 A1 | 9/2014 | Baier et al. |
| 2014/0285318 A1 | 9/2014 | Audeon et al. |
| 2014/0312913 A1 | 10/2014 | Kikuchi et al. |
| 2014/0327318 A1 | 11/2014 | Calvin et al. |
| 2014/0335703 A1 | 11/2014 | Calvin et al. |
| 2014/0341220 A1 | 11/2014 | Lessmann |
| 2015/0046701 A1 | 2/2015 | Rooyakkers et al. |
| 2015/0048684 A1 | 2/2015 | Rooyakkers et al. |
| 2015/0115711 A1 | 4/2015 | Kouroussis et al. |
| 2015/0365240 A1 | 12/2015 | Callaghan |
| 2016/0065656 A1 | 3/2016 | Patin et al. |
| 2016/0069174 A1 | 3/2016 | Cannan et al. |
| 2016/0172635 A1 | 6/2016 | Stimm et al. |
| 2016/0224048 A1 | 8/2016 | Rooyakkers et al. |
| 2016/0301695 A1 | 10/2016 | Trivelpiece et al. |
| 2018/0190427 A1 | 7/2018 | Rooyakkers et al. |

FOREIGN PATENT DOCUMENTS

| | | |
|---|---|---|
| CN | 1440254 A | 9/2003 |
| CN | 1571335 A | 1/2005 |
| CN | 1702582 A | 11/2005 |
| CN | 1839581 A | 9/2006 |
| CN | 101005359 A | 7/2007 |
| CN | 101069407 A | 11/2007 |
| CN | 101262401 A | 9/2008 |
| CN | 101322089 A | 12/2008 |
| CN | 101447861 A | 6/2009 |
| CN | 101533380 A | 9/2009 |
| CN | 101576041 A | 11/2009 |
| CN | 201515041 U | 6/2010 |
| CN | 101809557 A | 8/2010 |
| CN | 101919139 A | 12/2010 |
| CN | 101977104 A | 2/2011 |
| CN | 102035220 A | 4/2011 |
| CN | 102237680 A | 11/2011 |
| CN | 202205977 U | 4/2012 |
| CN | 102480352 A | 5/2012 |
| CN | 1934766 B | 6/2012 |
| CN | 102546707 A | 7/2012 |
| CN | 102809950 A | 12/2012 |
| CN | 102812578 A | 12/2012 |
| CN | 103376766 A | 10/2013 |
| CN | 103682883 A | 3/2014 |
| CN | 103701919 A | 4/2014 |
| CN | 104025387 A | 9/2014 |
| CN | 203932181 U | 11/2014 |
| CN | 104185969 A | 12/2014 |
| CN | 204243110 U | 4/2015 |
| CN | 105556762 A | 5/2016 |
| CN | 104025387 B | 7/2018 |
| DE | 102013213550 A | 1/2015 |
| EP | 0473336 A2 | 3/1992 |
| EP | 507360 A2 | 10/1992 |
| EP | 1176616 A2 | 1/2002 |
| EP | 1241800 A1 | 9/2002 |
| EP | 1246563 A1 | 10/2002 |
| EP | 1571559 A1 | 9/2005 |
| EP | 1877915 A2 | 1/2008 |
| EP | 1885085 A1 | 2/2008 |
| EP | 2179364 A2 | 4/2010 |
| EP | 2317743 A1 | 5/2011 |
| EP | 2450921 A1 | 5/2012 |
| EP | 2557657 A2 | 2/2013 |
| EP | 2557670 A2 | 2/2013 |
| EP | 1885085 B1 | 3/2013 |
| EP | 2613421 A1 | 7/2013 |
| EP | 2777796 A1 | 9/2014 |
| EP | 2806319 A2 | 11/2014 |
| JP | S57-168816 | 5/1984 |
| JP | S5974413 U | 5/1984 |
| JP | S59177226 U | 11/1984 |
| JP | H0163190 U | 4/1989 |
| JP | 4-245411 | 9/1992 |
| JP | H05346809 | 12/1993 |
| JP | 7105328 A | 4/1995 |
| JP | 07-320963 A | 12/1995 |
| JP | 08-037121 | 2/1996 |
| JP | 8-037121 | 2/1996 |
| JP | 08-098274 | 4/1996 |
| JP | 8241824 A | 9/1996 |
| JP | 8322252 A | 12/1996 |
| JP | H09182324 A | 7/1997 |
| JP | 11-89103 A | 3/1999 |
| JP | 11-098707 A | 4/1999 |
| JP | 11-235044 | 8/1999 |
| JP | H11230504 A | 8/1999 |
| JP | 11-312013 | 11/1999 |
| JP | 2001292176 A | 10/2001 |
| JP | 2001307055 A | 11/2001 |
| JP | 2002134071 A | 5/2002 |
| JP | 2000252143 A | 9/2002 |
| JP | 2002280238 A | 9/2002 |
| JP | 2002343655 A | 11/2002 |
| JP | 2002359131 A | 12/2002 |
| JP | 3370931 B2 | 1/2003 |
| JP | 2003047912 A | 2/2003 |
| JP | 2003068543 A | 3/2003 |
| JP | 2003-142327 | 5/2003 |
| JP | 2003152703 A | 5/2003 |
| JP | 2003152708 A | 5/2003 |
| JP | 2003216237 A | 7/2003 |
| JP | 2004501540 A | 1/2004 |
| JP | 2004303701 A | 10/2004 |
| JP | 2005038411 A | 2/2005 |
| JP | 2005513956 A | 5/2005 |
| JP | 2005151720 A | 6/2005 |
| JP | 2005250833 A | 9/2005 |
| JP | 2005275777 A | 10/2005 |
| JP | 2005531235 A | 10/2005 |
| JP | 2005327231 A | 11/2005 |
| JP | 2005332406 A | 12/2005 |
| JP | 2006060779 A | 3/2006 |
| JP | 2006180460 A | 7/2006 |
| JP | 2006223950 A | 8/2006 |
| JP | 2006238274 A | 9/2006 |
| JP | 2007034711 A | 2/2007 |
| JP | 2007096817 A | 4/2007 |
| JP | 2007519150 A | 7/2007 |
| JP | 2007238696 A | 9/2007 |
| JP | 2007252081 A | 9/2007 |
| JP | 2008215028 A | 9/2008 |
| JP | 2008257707 A | 10/2008 |
| JP | 2008538668 A | 10/2008 |
| JP | 4245411 B2 | 3/2009 |
| JP | 2009157913 A | 7/2009 |
| JP | 2009163909 A | 7/2009 |
| JP | 2010503134 A | 1/2010 |
| JP | 4439340 | 3/2010 |
| JP | 20150515407 A | 5/2010 |
| JP | 2010135903 A | 6/2010 |
| JP | 2011078249 A | 4/2011 |
| JP | 2011217037 A | 10/2011 |
| JP | 2011223544 A | 11/2011 |
| JP | 5013019 B1 | 8/2012 |
| JP | 2012190583 A | 10/2012 |
| JP | 2012195259 A | 10/2012 |
| JP | 2013021798 A | 1/2013 |
| JP | 2013170258 A | 9/2013 |
| JP | 2014507721 A | 3/2014 |
| JP | 2014080952 A | 5/2014 |
| JP | 2015023375 A | 2/2015 |
| JP | 2016512039 A | 4/2016 |
| JP | 6189479 B1 | 8/2017 |
| KR | 10-20020088540 | 11/2002 |
| KR | 20050014790 A | 2/2005 |
| KR | 20060034244 A | 4/2006 |
| KR | 1007053800000 B1 | 4/2007 |
| KR | 100807377 B1 | 2/2008 |
| TW | 201310344 A1 | 3/2013 |
| WO | 2005070733 A1 | 8/2005 |
| WO | 2006059195 A1 | 6/2006 |

(56) References Cited

FOREIGN PATENT DOCUMENTS

| WO | 2007041866 A1 | 4/2007 |
|---|---|---|
| WO | 2007148462 A1 | 12/2007 |
| WO | 2008083387 A2 | 7/2008 |
| WO | 2009032797 A2 | 3/2009 |
| WO | 2011104935 A1 | 9/2011 |
| WO | 2013033247 A1 | 3/2013 |
| WO | 2013102069 A1 | 7/2013 |
| WO | 2014179556 A1 | 11/2014 |
| WO | 2014179566 A1 | 11/2014 |
| WO | 2015020633 A1 | 2/2015 |

OTHER PUBLICATIONS

Office Action dated Mar. 1, 2017 for Chinese Appln. No. 201410182071.8.
Office Action dated May 31, 2017 for Chinese Appln. No. 201410383686.7.
Office Action for Chinese Application No. 201410802889.5, dated Jul. 26, 2018.
Office Action for Canadian Application No. 2,875,517, dated May 4, 2015
European Search Report for European Application No. 14196406.4, dated Sep. 23, 2015.
Extended Search Report for European Application No. 16165112.0, dated Sep. 6, 2016.
Examination Report for European Application No. 16165112.0, dated Feb. 16, 2018.
Notice of Reason for Rejection for Japanese Application No. 2014-243827, dated Jan. 24, 2019.
Office Action for Chinese Application No. 2015103905202.2, dated Jun. 20, 2018.
Office Action for Chinese Application No. 2015103905202.2, dated Mar. 6, 2019.
Search Report for European Application No. 15175744.0, dated Apr. 26, 2016.
Partial Search Report for European Application No. 15175744.0, dated Dec. 14, 2015.
Office Action for Canadian Application No. 2,875,518, dated Jun. 3, 2015.
Office Action for Canadian Application No. 2,875,518, dated Apr. 22, 2016.
European Search Report for EP Application No. 14196408.0, dated Nov. 24, 2015.
Office Action for Canadian Application No. 2,875,515, dated Jul. 5, 2017.
Office Action for Canadian Application No. 2,875,515, dated Feb. 10, 2017.
Office Action for Canadian Application No. 2,875,515, dated Jun. 1, 2016.
Office Action for Canadian Application No. 2,875,515, dated Oct. 6, 2016.
Office Action for Chinese Application No. 201410799473.2, dated Oct. 12, 2018.
Examination Report for European Application No. 14196409.8, dated Jan. 22, 2018.
Search Report for European Application No. 14196409.8, dated May 19, 2016.
Notice of Reason for Rejection for Japanese Application No. 2014-243830, dated Sep. 21, 2018.
Office Action for Canadian Application No. 2,920,133, dated Jan. 30, 2017.
Office Action for Canadian Application No. 2,920,133, dated Oct. 19, 2016.
Search Report for European Application No. 16154943.1, dated Jun. 17, 2016.
Partial European Search Report in European Application No. 17208183.8, dated Mar. 28, 2018.
Examination Report in European Application No. 17206183.8, dated Jun. 22, 2018.
Examination Report in European Application No. 17208183.8, dated Feb. 27, 2019.
Office Action for Chinese Appln. No. 201610239130.X, dated Feb. 14, 2018.
Office Action for Chinese Appln. No. 201610239130.X, dated Aug. 2, 2017.
Office Action for Chinese Application No. 201280065564.2, dated Aug. 3, 2016.
Office Action for Chinese Application No. 201280065564.2, dated Feb. 28, 2017.
Office Action for Chinese Application No. 201280065564.2, dated Oct. 19, 2017.
Partial Supplementary European Search Report in Application No. 12862174.5, dated Nov. 3, 2015.
European Search Report in Application No. 12362174,5, dated Feb. 15, 2016.
European Search Report in Application No. 17178867.2, dated Nov. 2, 2017.
Office Action for Japanese Application No. 2014-550508, dated Dec. 2, 2016.
Office Action for Japanese Application No. 2014-550508, dated Sep. 15, 2017.
Office Action for Chinese Application No. 201410383686.7, dated Feb. 23, 2018.
Office Action for Chinese Application No. 201480034066.0, dated May 3, 2017.
Search Report and Opinion for European Application No. 14166908.8, dated Jan. 7, 2015.
Extended Search Report for European Application No. 14180106.8, dated Jul. 13, 2015.
Examination Report for European Application No. 14180106.8, dated Jun. 28, 2017.
Supplementary Search Report for European Application No. 14791210.9, dated Dec. 6, 2016.
Office Action for Japanese Application No. 2014-080952, dated May 2, 2018.
Office Action for Japanese Application No. 2014-080952, dated Jan. 7, 2019.
Office Action for Japanese Application No. 2014-159475, dated Jul. 18, 2018.
Office Action for Japanese Application No. 2014-159475, dated Feb. 15, 2019.
Office Action for Japanese Application No. 2016-512039, dated Jun. 5, 2018.
Office Action for Japanese Application No. 2016-512039, dated Feb. 5, 2019.
International Search Report and Written Opinion for PCT/US2014/036368, dated Sep. 12, 2014.
Office Action for Chinese Appln No. 201380079515.9, dated Nov. 16, 2017.
Office Action for Chinese Appln No. 201380079515.9 dated Aug. 7, 2018.
Office Action for Chinese Appln No. 201380079515.9, dated Feb. 25, 2019.
Supplementary Search Report in European Application No. 13890953.6, dated Jan. 26, 2017.
Office Action for Japanese Application No. 2016-533280, dated Jun. 28, 2017.
Office Action for Japanese Application No. 2016-533280, dated Apr. 11, 2018.
Office Action for Japanese Application No. 2016-533280, dated Jan. 7, 2019.
International Search Report and Written Opinion for PCT/US2013/053721, dated May 12, 2014.
Office Action for Chinese Appln No. 201380079514.4, dated Feb. 5, 2018.
Office Action for Chinese Appln No. 201380079514.4, dated Nov. 5, 2018.
Examination Report for European Application No. 13891327.2, dated Sep. 26, 2018.
Supplementary Search Report for European Application No. 13891327.2, dated Jan. 10, 2017.

(56) References Cited

OTHER PUBLICATIONS

Reason for Rejection in Japanese Patent Application No. 2016-533279, dated Aug. 13, 2018.
Notice of Reasons for Rejection in Japanese Patent Application No. 2016-533279, dated Jul. 13, 2017.
Notice of Reason for Rejection in Japanese Patent Application No. 2016-533279, dated Mar. 1, 2018.
Fabien Fleuot, "Raspberry Pi + Mihini, Controlling an off-the-grid Electrical Installation, Part I," Apr. 11, 2014, XP055290314.
Generex Systems Gmbh, "BACS—Battery Analysis & Care System," Aug. 17, 2014, XF055290320.
Siemens, "Uninterruptible 24 V DC Power Supply High-Performance, communicative and integrated in TIA," Mar. 31, 2015, XP055290324.
"Introduction to Cryptography," Network Associates, Inc., PGP 6.5.1, 1990-1999, Retrieved © (ftp://ftp.pgpi.org/pub/pgP/6.5/docs/english/IntroToCrypto.Pdf) on Mar. 17, 2016, (refer to pp. 16-20).
Stouffer, et al. "Guide to Industrial Control Systems (ICS)Security," NIST, Special Pub. 800-82, Jun, 2011, (refer to pp. 2-1 to 2-10)
Rodrigues, A, et al., "Scada Security Device," Proceedings of the Seventh Annual Workshop on Cyber Security and Information Intelligence Research, CSIIRW '11, Jan. 1, 2011, XP055230335.
Zafirovic-Vukotic, M. et al., "Secure SCADA network supporting NERC CIP", Power & Energy Society General Meeting, 2009, PES '09, IEEE, Piscataway, NJ, USA, Jul. 26, 2009, pp. 1-8, XP031538542.
Roman Kleinerman; Daniel Feldman (May 2011), Power over Ethernet (PoE): An Energy-Efficient Alternative (PDF), Marvell, retrieved Sep. 25, 2018 @ http://www.marvell.com/switching/assets/Marvell-PoE-An-Energy-Efficient-Alternative.pdf (Year: 2011).
Molva, R, Ed et al., "Internet security architecture", Computer Networks, Elsevier Science Publishers B. V., Amsterdam, NL, vol. 31, No. 3, Apr. 23, 1999, pp. 787-804, XP004304518.
Rodrigues, A., "SCADA Security Device: Design and Implementation", Master of Science Thesis, Wichita State University, Dec. 2011.
CGI, White Paper on "Public Key Encryption and Digital Signature: How do they work?", 2004 (refer to pp. 3-4).
Canadian Office Action for Application No. 2920133 dated Jan. 30, 2017.
Chinese Office Action for Application No. 2920133 dated Oct. 19, 2016.
Supplementary European Search Report for European Patent Application No. EP 14791210 dated Dec. 16, 2016, 11 pages.
Siemens AG: "ERTEC 400 I Enhanced Real-Time Ethernet Controller I Handbuch",no. Version 1.2.2 pp. 1-98, XP002637652, Retrieved from the Internet: URL:http:IIcache.automation.siemens.comIdnniiDUI DUxNDgzNwAA_21631481_HBIERTEC400_Handbuch_V122.pdf [retrieved on May 2, 2011].
Search Report for European Application No. 14196406.4, dated Nov. 4, 2015.
European Search Report dated Dec. 2, 2015 for EP Application No. 14196408.0.
European search report for European Patent Application No. EP14196406 dated Oct. 2, 2015, 6 pages.
European Search Report published Nov. 4, 2015 in Application No. EP14196406.4.
Examination Report for European Application No. 17178867.2, dated Mar. 13, 2019.
Examination Report for European Application No. 16165112.0, dated Apr. 17, 2019.
Examination Report for European Patent Application No. 16154943.1, dated May 16, 2019.
Extended European Search Report for Application No. EP14180106.8, dated Aug. 12, 2015.
Extended European Search Report for European Patent Application No. EP 14196409 dated May 31, 2016, 10pages.
Extended European Search Report for European Patent Application No. EP 16154943 dated Jun. 29, 2016, 9pages.
Extended European Search Report for European Patent Application No. EP 18176358 dated Sep. 11, 2018, 11 pages.
International Search Report and Written Opinion dated May 12, 2014 in International Application# PCT/US2013/053721.
Notice of Reason for Rejection for Japanese Patent Application No. 2014-243830, dated Jul. 10, 2019.
Notice of Reason for Rejection for JP Patent Application No. 2018-109151, dated Jun. 25, 2019.
Office Action for Chinese Application No. 2015103905202.2, dated Aug. 6, 2019.
Partial Supplementary European Search Report dated Nov. 10, 2015 in Application# EP12862174.5.
Office Action for Canadian Application No. 2,875,515 dated Feb. 17, 2016.
Office Action for Chinese Patent Application 201410802889.5, dated May 7, 2019.
Office Action for Canadian Application No. 2,920,133, dated Apr. 14, 2016.
Office Action for Chinese Application No. 20141079995.2, dated Jul. 3, 2019.
Partial European Search Report for European Patent Application No. EP 15175744 dated Jan. 4, 2016, 7 pages.
Baran, M. et al., "Overcurrent Protection on Voltage-Source-Converter-Based Multiterminal DC Distribution Systems," IEEE Transactions on Power Delivery, vol. 22, No. 1, Jan. 2007, pp. 406-412.
Decision of Rejection for Patent Application No. 2014-243827, dated Nov. 28, 2019.
Decision of Rejection for Chinese Application No. 2015103905202.2, dated Nov. 5, 2019.
Examination Report for European Patent Application No. 1720883.8, dated Oct. 29, 2019.
Notice of Reason for Rejection for Patent Application No. 2016-021763, dated Nov. 27, 2019.
Office Action for Chinese Patent Application No. 201610236358.3, dated Sep. 4, 2019.
Office Action forChinese Patent Application 201410802889.5, dated Dec. 4, 2019.
Office Action from Chinese Patent Application No. 201610229230.4, dated Oct. 24, 2019.
Office Action from EP Application No. 14196406.4, dated Jul. 29, 2019.
Office Action for Japanese Application No. 2015-136186, dated Oct. 10, 2019.
Supplementary European Search Report for European Patent Application No. EP 13890953 dated Feb. 6, 2017, 9 pages.
Office Action for Japanese Application No. 2014-159475, dated Jun. 11, 2018.
Decision of Rejection for Japanese Application No. 2014-243830, dated Mar. 18, 2020.
Notice of Reason for Rejection for Japanese Application No. 2016-080207, dated Jun. 4, 2020.
Reason for Rejection for Japanese Application No. 2015-136186, dated May 7, 2020.
Summons to attend oral proceedings for European Application No. 14196409.8, dated Nov. 13, 2019.
Office Action for Japanese Application No. 2016-533280, dated Jun. 29, 2020.
Office Action for Chinese Patent Application No. 201610236358.3, dated Jun. 24, 2020.
Office Action from Chinese Patent Application No. 201610229230.4, dated Jul. 15, 2020.

* cited by examiner

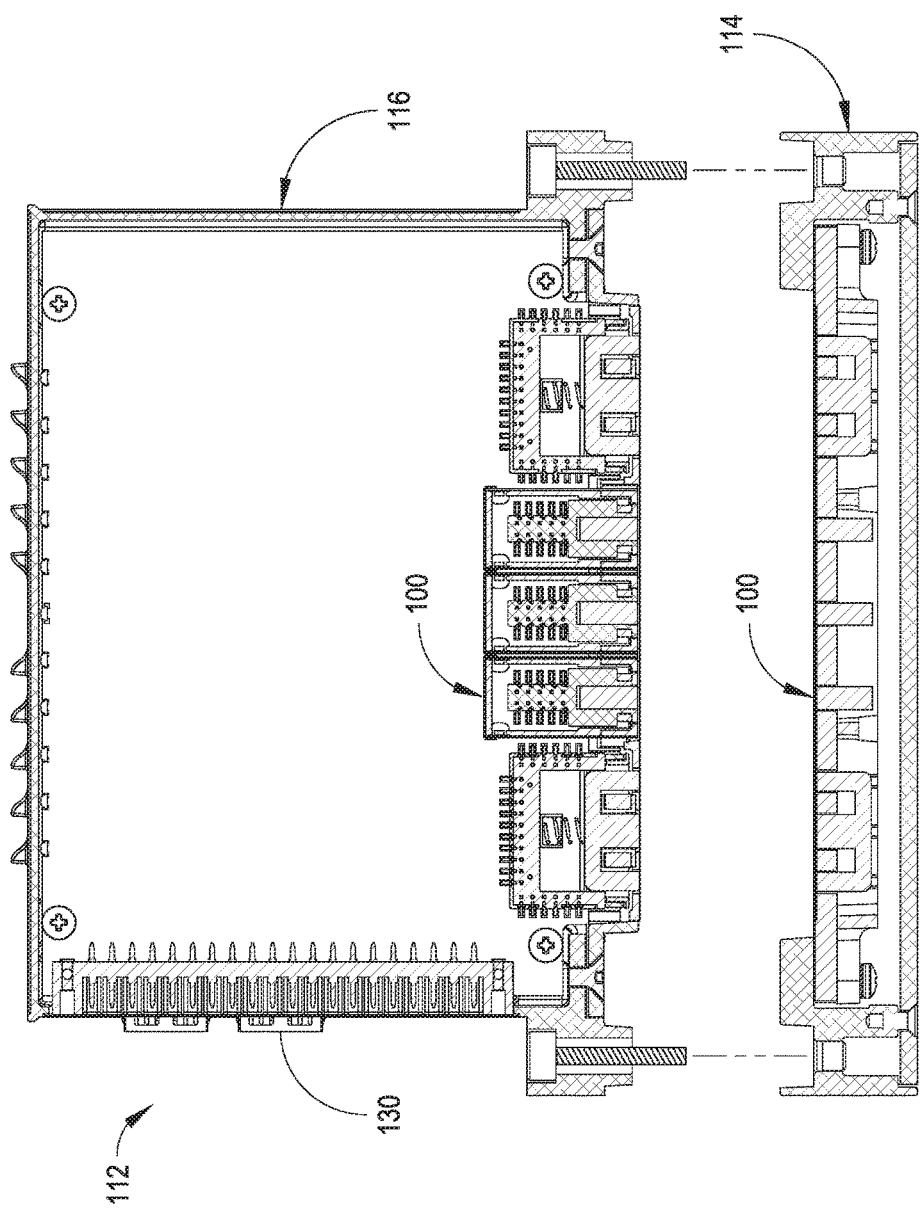

ELECTROMAGNETIC CONNECTORS FOR AN INDUSTRIAL CONTROL SYSTEM

CROSS-REFERENCE TO RELATED APPLICATIONS

The present application is a continuation under 35 U.S.C. § 120 of U.S. patent application Ser. No. 15/248,006, filed Aug. 26, 2016, and titled "ELECTROMAGNETIC CONNECTOR FOR AN INDUSTRIAL CONTROL SYSTEM," which itself is a continuation under 35 U.S.C. § 120 of U.S. patent application Ser. No. 13/959,888, filed Aug. 6, 2013, and titled "ELECTROMAGNETIC CONNECTOR FOR AN INDUSTRIAL CONTROL SYSTEM," which itself is a continuation-in-part under 35 U.S.C. § 120 of U.S. patent application Ser. No. 13/875,858, filed May 2, 2013, and titled "Electromagnetic Connectors;" U.S. patent application Ser. No. 13/341,176, filed Dec. 30, 2011, and titled "COMMUNICATIONS CONTROL SYSTEM WITH A SERIAL COMMUNICATIONS INTERFACE AND A PARALLEL COMMUNICATIONS INTERFACE;" U.S. patent application Ser. No. 13/341,161, filed Dec. 30, 2011, and titled "SWITCH FABRIC HAVING A SERIAL COMMUNICATIONS INTERFACE AND A PARALLEL COMMUNICATIONS INTERFACE;" and U.S. patent application Ser. No. 13/341,143, filed Dec. 30, 2011, and titled "ELECTROMAGNETIC CONNECTOR FOR AN INDUSTRIAL CONTROL SYSTEM." U.S. patent application Ser. No. 13/959,888 is also a continuation-in-part of International Application No. PCT/US2012/072056, filed Dec. 28, 2012, and titled, "ELECTROMAGNETIC CONNECTOR AND COMMUNICATIONS/CONTROL SYSTEM/SWITCH FABRIC WITH SERIAL AND PARALLEL COMMUNICATIONS INTERFACES." U.S. patent application Ser. Nos. 15/248,006; 13/959,888; 13/875,858; 13/341,176; 13/341,161; and Ser. No. 13/341,143; and International Application No. PCT/US2012/072056 are herein incorporated by reference in their entireties.

BACKGROUND

Electrical connectors are mechanical assemblies used to complete an electrical circuit or join two or more electrical circuits together. Plug and socket type electrical connectors generally include a male plug and a female receptacle, with multiple pin or prong contacts in the male plug configured for insertion into openings in a mating socket of the female receptacle. Multi-pin connectors employ multiple metal pins. Thus, the connections between mating metal parts (e.g., pins and sockets) must be capable of furnishing good electrical connections to complete the electrical circuits. For example, multi-pin connectors are used as interconnects in Industrial Control Systems (ICS)/Process Control Systems (PCS) to connect Input/Output (I/O) devices to power and/or communications signal transmission circuitry. Such circuitry may be used by, for instance, a power backplane, where multiple electrical connectors are connected in parallel to a common electrical power supply. Other types of electrical connectors include: Eight Positions, Eight Conductors (8P8C) modular connectors used for Ethernet and Category 5 (CAT5) cables; D subminiature connectors used for Recommended Standard 232 (RS-232) modem serial ports, computers, telecommunications, test/measurement instruments, monitors, joysticks, mice, and game consoles; Universal Serial Bus (USB) connectors, including Type A, Type B, Mini-A, Mini-B, Micro-A, and Micro-B connectors used for interfacing devices; electrical power connectors, such as Alternating Current (AC) power plugs and sockets (e.g., plugs having protruding prongs, blades, and/or pins that fit into matching slots and/or holes in sockets, receptacles, outlets, power points, and so forth), and Direct Current (DC) connectors, such as coaxial power connectors; as well as Radio Frequency (RF) connectors for transmitting RF signals; and the like.

SUMMARY

In one or more implementations, a device is disclosed that includes multiple electrical circuits and an electromagnetic connector configured to form a first magnetic circuit portion that comprises a first core member and multiple coils disposed about the first core member. Respective ones of the multiple coils are configured to separately connect to a corresponding one of the multiple electrical circuits. The electromagnetic connector is configured to mate with a second electromagnetic connector, where the second electromagnetic connector is configured to form a second magnetic circuit portion that comprises a second core member and a coil disposed about the second core member. When the electromagnetic connector is mated with the second electromagnetic connector, the first core member and the second core member are configured to couple the multiple coils of the electromagnetic connector to the coil of the second electromagnetic connector with a magnetic circuit formed from the first magnetic circuit portion and the second magnetic circuit portion. The magnetic circuit is configured to induce a signal in a first coil of the multiple coils and the coil of the second electromagnetic connector when a second coil of the multiple coils is energized (e.g., in the manner of a passive hub).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

FIG. 1 is an isometric view illustrating a connector assembly comprising a first electromagnetic connector mated with a second electromagnetic connector, where the first electromagnetic connector includes first and second coils disposed about a first core member, and the second electromagnetic connector includes another coil disposed about a second core member, and where the first and second electromagnetic connectors form a magnetic circuit configured to induce a signal in the first coil of the first electromagnetic connector and the coil of the second electromagnetic connector when the second coil of the first electromagnetic connector is energized (e.g., in the manner of a passive hub) in accordance with an example embodiment of the present disclosure.

FIG. 5A is a cross-sectional end view of a system including a module (e.g., an industrial element) configured to couple with a backplane using electromagnetic connectors in accordance with an example embodiment of the present disclosure.

DETAILED DESCRIPTION

Overview

Figure 1:
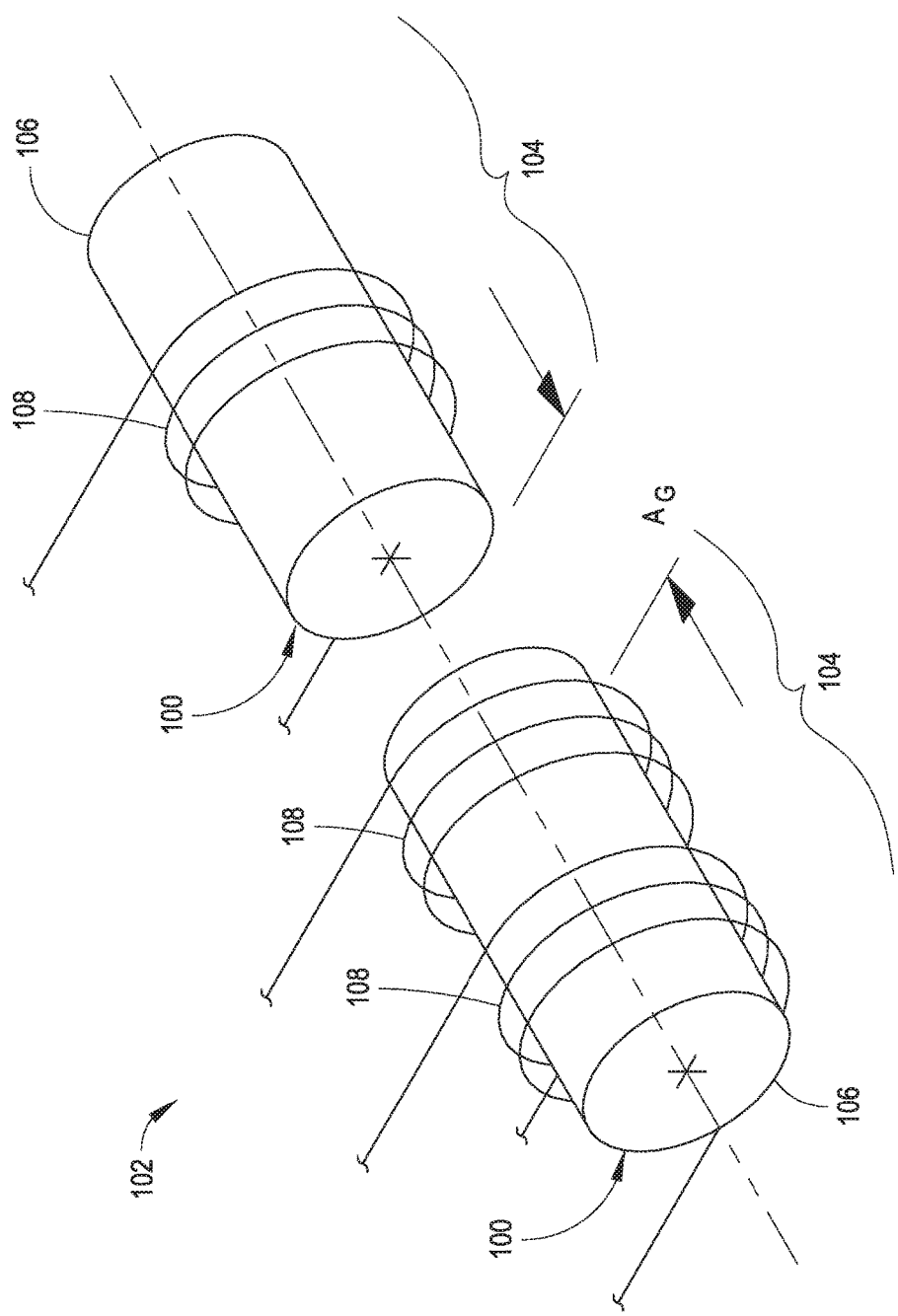

Multi-pin connectors are typically used in industrial control systems/process control systems to connect I/O devices to power and/or communications signal transmission circuitry included with a power backplane. The pin interconnects provide high precision signal resolution and are often constructed from high quality materials, such as hardened steel with gold plating, and so forth. Care must be taken when connecting and disconnecting multi-pin connectors to avoid bending or misaligning the various pins. Additionally, in both industrial settings and in the field, pin interconnects are often exposed to corrosive materials and contaminants, and may be subject to oxidation and coating, leading to intermittent failures. The nature and cause of the failures may be difficult and costly to determine. Thus, multi-pin connectors are generally a high cost and high maintenance component of industrial control systems hardware.

Industrial control systems/process control systems may also require galvanic isolation between I/O devices and associated power transmission and control equipment. For example, I/O devices typically use transformers and/or optical equipment for signal transmission to electrically isolate the I/O devices, prevent ground loops, and so forth. Industrial systems may provide a backplane for power and/or communications signal transmission, with pluggable I/O devices connected to the backplane. Each pluggable I/O device may use multi-pin connectors for both power and communications transmissions, along with Pulse-Width Modulation (PWM)/Pulse-Duration Modulation (PDM) and a power transformer to achieve isolation between the backplane and the I/O devices. For example, the backplane may use a DC power source and connectors to deliver DC signals to the I/O devices. Each I/O device may then use a PWM to convert the DC signals to AC and a transformer to deliver the power/communications signals to circuitry. The use of the high quality multi-pin connectors, PWM circuitry, and power transformers increases the cost and complexity of the I/O devices.

Accordingly, electromagnetic connector assemblies are described that employ electromagnetic connectors which form portions of a magnetic circuit. One or more of the electromagnetic connectors comprises a core member and multiple coils disposed about the core member. In implementations, the electromagnetic connectors are configured to mate with other electromagnetic connectors so that, when one electromagnetic connector is mated with another electromagnetic connector, the core members of the connectors couple the coils of the first connector to one or more coils of the second connector to complete the magnetic circuit. When one coil of the multiple coils is energized, the magnetic circuit is configured to induce a signal in another coil of the multiple coils and one or more coils of the second connector. Further, when a coil of the second connector is energized, a signal is induced in the multiple coils of the first connector. In this manner, an electromagnetic connector assembly can be used in the manner of a passive hub. Electromagnetic connectors can be used to facilitate communications between, for example, an I/O module and a backplane.

Electromagnetic connectors configured in accordance with the present disclosure need not necessarily require precision contact, pressure, and/or alignment to complete the magnetic circuit linking the tightly coupled coils. In implementations, the electromagnetic connectors can be used in industrial control systems having a power backplane/bus configuration. For example, the electromagnetic connectors can be used with one or more I/O modules in place of the PWM, separate power transformer, and associated transistors that would otherwise be required for each I/O module to maintain isolation between the I/O modules and the power backplane. The electromagnetic connectors can also be used in place of multi-pin connectors for communications and/or power signal transmission. Eliminating multiple PWM's, power transformers, transistors, and multi-pin connectors can provide a significant cost and space savings for this type of configuration, along with increased galvanic isolation between sensor and control components. Further, contactless interconnection for signal transmission can provide more environmentally robust structures, reducing or eliminating field failures due to corrosion, pin misalignment, and so forth.

In one or more implementations, the electromagnetic connector assemblies are employed in a system that includes a backplane for distributing an AC signal. The system can include a number of electromagnetic connectors coupled with the backplane. As described herein, the electromagnetic connectors comprise a core member and one or more coils disposed of the core member (e.g., as previously described). Each one of the electromagnetic connectors is configured to mate with another electromagnetic connector, which can be included within a module. When the electromagnetic connectors are mated, the coils are coupled via a magnetic circuit. The magnetic circuit is configured to induce a signal in one or more coils of the module when a coil of the backplane, or another coil of the module, is energized. Further, when a coil of the module is energized, the magnetic circuit is configured to induce a signal in one or more coils of the backplane. The backplane can be used to power and/or furnish communications with circuitry of the module.

The system can be configured for an industrial control system/process control system having a multidrop power backplane/bus configuration that transmits high frequency AC power using DC-to-AC (DC/AC) conversion circuitry and distributed transformers, with electromagnetic connectors configured as previously described. A system configured in accordance with the present disclosure can eliminate the use of a separate PWM for each I/O device, replacing multiple PWMs with, for example, a single PWM located on the backplane. Thus, a typical connector and power transformer configuration can be replaced with magnetic circuits (e.g., tightly coupled transformers). Each magnetic circuit can be configured as two portions (e.g., halves) of a transformer, where one portion (e.g., half) of the transformer is located in each module, and the other portion (e.g., half) is located in the backplane. The portion of the transformer in the backplane can comprise, for example, the primary coil and a portion of the core. The portion of the transformer in each module can comprise the secondary coil and a mating core. Electrical power in the primary coil is extracted by the secondary coil, and can then be rectified and used to power and/or communicate with circuitry in each module.

A system configured in accordance with the present disclosure can be implemented as a communications control system that includes a switch fabric having a serial communications interface (e.g., a serial or Multidrop Bus (MDB) with a master and multiple slaves) and a parallel communications interface (e.g., a parallel or point-to-point bus implemented using a cross switch, or the like). The serial communications interface and the parallel communications interface can be used for connecting multiple Input/Output (I/O) modules to communications/control modules, and to one another.

Example Implementations

FIGS. 1 through 5 illustrate example electromagnetic connectors 100 of connector assemblies 102 in accordance with example implementations of the present disclosure. The electromagnetic connectors 100 can be used in any application where it is desirable to couple electrical circuits together for transmitting electrical signals and/or electrical power from one circuit to another, while maintaining isolation between the circuits. For instance, the electromagnetic connectors 100 can be used in applications including, but not necessarily limited to: industrial control systems/process control systems (e.g., to connect I/O devices with power and/or communications signal transmission circuitry), telecommunications (e.g., for audio, broadband, video, and/or voice transmission), information/data communications (e.g., for connecting computer networking equipment, such as Ethernet equipment, modems, and so forth), computer hardware interconnection (e.g., for connecting peripherals, such as joysticks, keyboards, mice, monitors, and so on), game consoles, test/measurement instruments, electrical power connectors (e.g., for power transmission from AC mains), and the like.

Each one of the electromagnetic connectors 100 is configured to form a magnetic circuit portion 104, which includes a core member 106 and one or more coils 108 disposed about (e.g., around and/or within) the core member 106. For the purposes of the present disclosure, it should be noted that "core member" is used to refer to an incomplete part of a magnetic core, which is completed by another core member when the electromagnetic connectors 100 are coupled together. Each electromagnetic connector 100 is configured to mate with another electromagnetic connector 100 of a connector assembly 102 for transmitting power and/or communications signals between components that are connected via the electromagnetic connectors 100. For example, a first I-shaped or E-shaped core member 106 of an electromagnetic connector 100 is configured to mate with a second I-shaped or E-shaped core member 106 of another electromagnetic connector 100 to transmit communications signals between the first electromagnetic connector 100 and the second electromagnetic connector 100.

In implementations where one core member 106 is configured to contact another core member 106, the contact surfaces may be substantially flat, but this configuration is provided by way of example only and is not meant to limit the present disclosure. Thus, other implementations may be provided, including implementations designed to increase the surface area of contact between core members and/or to provide self-alignment of the core members (e.g., by configuring a portion of one core member for insertion into another core member). For example, one core member comprises a tapered pin configured for insertion into a tapered hole of another core member, where the outside periphery and/or an end of the tapered pin is configured to contact a portion of the interior wall and/or a bottom surface of the tapered hole. In some embodiments, electromagnetic connectors 100 furnish an interference fit configuration, e.g., where one or more coils 108 are disposed around a first core member 106, and one or more other coils 108 are disposed within a second core member 106. The interference fit can be established using connectors having geometries including, but not necessarily limited to: conical, concentric, eccentric, geometric, sloped for friction fit, and so forth.

In embodiments of the disclosure, the first core member 106 is not necessarily configured to contact the second core member 106 when the first electromagnetic connector 100 is mated with the second electromagnetic connector 100. One or more gaps may be provided between various points of a particular pair of mating core members 106. For example, as illustrated in FIG. 1, in an embodiment with two I-shaped core members 106, an air gap AG is provided between the first I-shaped core member 106 and the second I-shaped core member 106. For example, a first core member 106 is supported proximal to, but not necessarily in electrical contact with, a second core member 106. Further, an air gap AG may be provided by mating an E-shaped core member 106 with a C-shaped core member, a U-shaped core member, an I-shaped core member, and so forth. For example, the middle leg of one E-shaped core member can be configured to extend through both a first circuit board with a first coil comprising a planar winding, and a second circuit board with second coil comprising a planar winding, where the outer legs of the E-shaped core member are configured to contact the legs of another U-shaped core member. In this configuration, the coil disposed of the U-shaped core member can be positioned between the legs of the "U." However, planar windings are provided by way of example only and are not meant to be restrictive of the present disclosure. Thus, a coil 108 may comprise other windings, such as insulated copper windings wrapped around or within a core member 106, and so forth.

It should be noted that while the core members 106 are shown as I-shaped and E-shaped in the accompanying figures, these shapes are provided by way of example only and are not meant to limit the present disclosure. Thus, a core member 106 and/or the combined form of two mating core members 106 may comprise other shapes and/or core geometries, including but not necessarily limited to: a "C"/ "U" core, an "EFD" core, an "EP" core, an "ER" core, a pot core, a toroidal core, a ring/bead core, and so forth. For example, the shape of a core member 106 may be selected based upon a coupling/operating frequency. Further, a core member 106 can be implemented as a planar core (e.g., with a planar winding). In implementations, the core member 106 may be formed in or on a circuit board, e.g., along with a coil 108 formed as a planar winding, such that the core member 106 is electrically insulated from the coil 108 by one or more portions of the circuit board.

One or more core members 106 of the electromagnetic connectors 100 can be formed from an iron slurry material. However, this material is provided by way of example only and is not meant to limit the present disclosure. Thus, a core member 106 may comprise any material having a magnetic permeability suitable for confining and guiding magnetic fields generated by a coil 108, including, but not necessarily limited to: soft magnetic materials (i.e., magnetic materials with low hysteresis, such as silicon steel), ferromagnetic metals (e.g., iron), ferrimagnetic compounds (e.g., ferrites), and so forth.

One or more coils 108 of the first electromagnetic connector 100 can be tightly coupled to one or more coils 108 of the second electromagnetic connector 100 with a magnetic circuit formed from the magnetic circuit portion 104 of the first electromagnetic connector 100 and the magnetic circuit portion 104 of the second electromagnetic connector 100. The magnetic circuit is configured to induce a signal in one or more of the coils 108 of the first electromagnetic connector 100 when one or more of the coils 108 of the second electromagnetic connector 100 is energized, and to induce a signal in one or more of the coils 108 of the second electromagnetic connector 100 when one or more of the coils 108 of the first electromagnetic connector 100 is energized, allowing power and/or communications signals to be transmitted between components that are connected via the electromagnetic connectors 100. In implementations, the coils 108 can be tightly coupled (e.g., using an iron core to provide a coupling coefficient of about one (1)), critically coupled (e.g., where energy transfer in the passband is optimal), or overcoupled (e.g., where a secondary coil is close enough to a primary coil to collapse the primary coil's field).

In implementations, one or both of the core members 106 and/or coils 108 can be at least partially (e.g., fully or partially) mechanically encased within one or more layers of material. Further, in some embodiments, one or more layers of material (e.g., a protective layer 110) are disposed of the first core member 106 for separating the first core member 106 from the second core member 106 when the first electromagnetic connector 100 is mated with the second electromagnetic connector 100. The protective layer 110 can be fabricated of a non-conductive/insulating material, such as a coating of thin film plastic material. The protective layer (e.g., non-conductive/insulating material) can be applied using techniques including, but not necessarily limited to: coating, painting, deposition, and so forth. In some embodiments, the protective layer 110 comprises a layer of five one-thousandths inch (0.005 in.) thick Lexan. In embodiments of the disclosure, the protective layer 110 is configured to protect the core member 106 and/or the coil 108 of the electromagnetic connector 100 from corrosion, mechanical damage (e.g., fracture), and so forth. Encasement may be especially useful when a core member 106 is constructed from a brittle material. For instance, the core member 106 can be tightly encased in a protective layer formed of a plastic material. In this manner, when damage to the core member (e.g., cracks or breaks in the core member) occurs, the pieces of material can be maintained in substantial contact with one another within the casing. Thus, damage to the core material may not significantly decrease performance.

FIGS. 2 through 5 illustrate systems 112 in accordance with example implementations of the present disclosure that are configured for use with process control systems technology, and so forth. For example, a system 112 is illustrated that may be used with a distributed control system comprised of controller elements and subsystems, where the subsystems are controlled by one or more controllers distributed throughout the system. The system 112 can include a switch fabric comprising a serial communications interface and/or a parallel communications interface for furnishing communications between one or more backplanes 114 and one or more modules 116. Each backplane 114 has a number of electromagnetic connectors 100, where each one of the electromagnetic connectors 100 includes a core member 106 and one or more coils 108 disposed of the core member 106 (e.g., as previously described). Each one of the electromagnetic connectors 100 included with a backplane 114 is configured to mate with another electromagnetic connector 100 included with a module 116, such as an industrial element, and so forth. For example, the system 112 can be implemented with electromagnetic connector 100 interconnects in an Industrial Control System (ICS)/Process Control System (PCS) to connect I/O devices to power and/or communications signal transmission circuitry.

Figure 2:
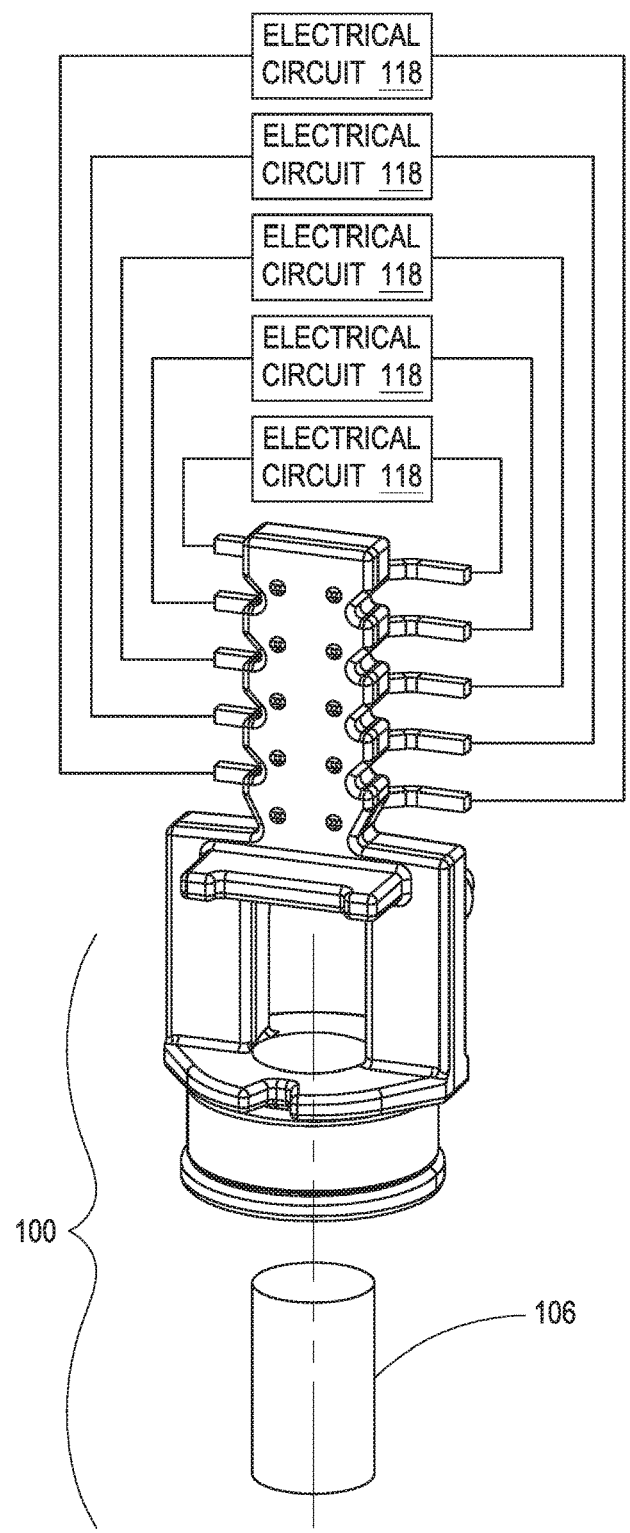
FIG. 2 is a diagrammatic illustration of an electromagnetic connector including multiple coils separately connected to multiple electrical circuits in accordance with an example embodiment of the present disclosure.

When the electromagnetic connectors 100 are mated, a core member 106 of the backplane 114 and a core member 106 of a module 116 are configured to couple the coils 108 via the magnetic circuit. The magnetic circuit is configured to induce a signal in one or more coils 108 of the module 116 when a coil 108 of backplane 114 is energized (e.g., with an AC signal from a DC/AC converter). The signal induced in coils 108 of the module 116 can be used to power and/or furnish communications with one or more electrical circuits 118, as shown in FIG. 2. It should be noted that while the backplane 114 is described as inducing a signal in the module 116, this implementation is provided by way of example only and is not meant to be restrictive of the present disclosure. Thus, the magnetic circuit can also be used to induce a signal in one or more coils 108 of the backplane 114 when a coil 108 of module 116 is energized to furnish communications with backplane 114. Further, the coils 108 included with mating electromagnetic connectors 100 can be energized in an alternating sequence (e.g., one after another) to provide bidirectional communication, and so forth.

Figure 3:
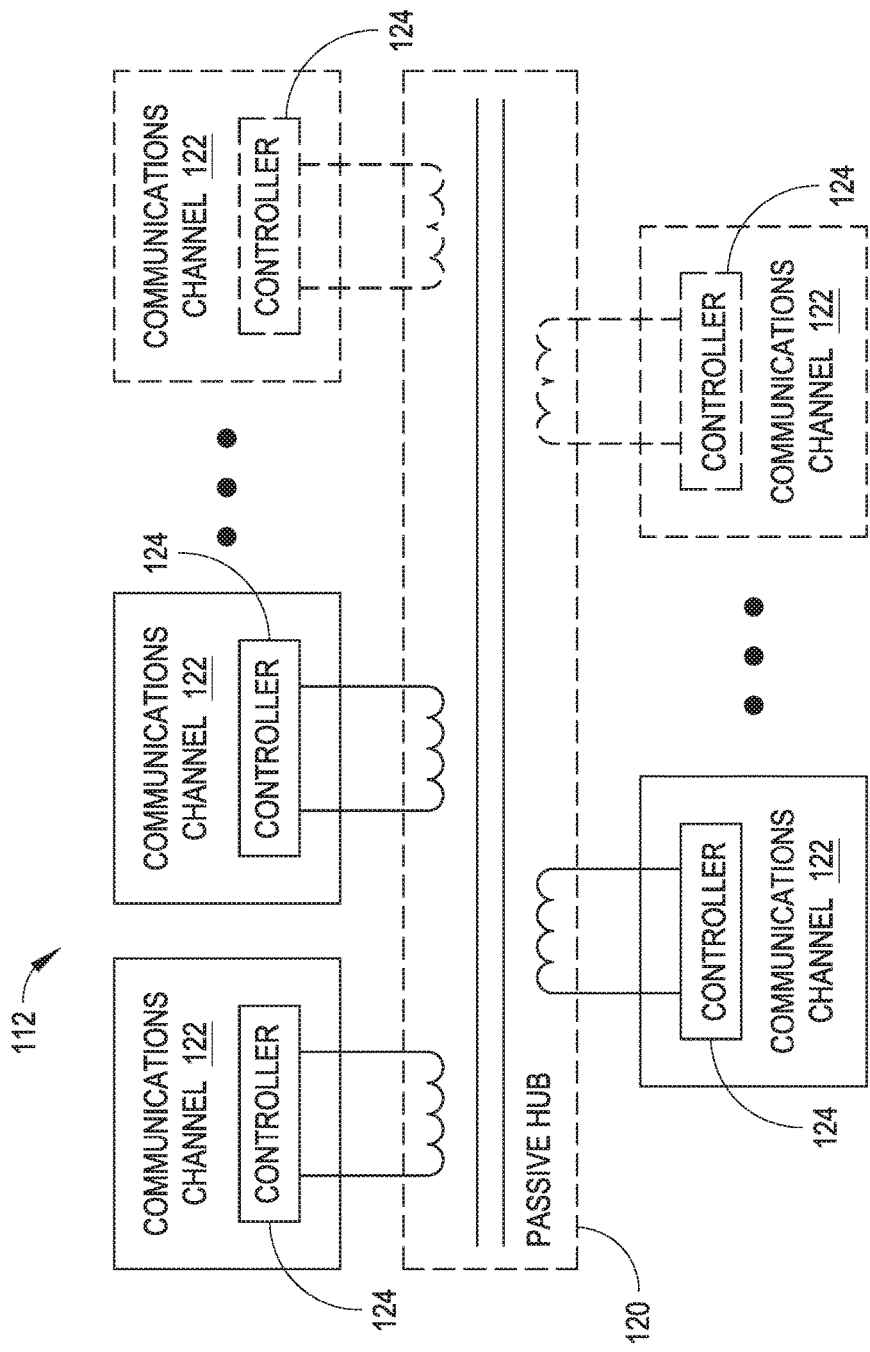
FIG. 3 is a partial diagrammatic illustration of a system including multiple communications channels connected together with a passive hub formed using electromagnetic connectors, such as the electromagnetic connector illustrated in FIG. 2, in accordance with an example embodiment of the present disclosure.

In embodiments of the disclosure, the module 116 and/or the backplane 114 includes multiple electrical circuits 118, where two or more of the electrical circuits 118 each separately connect to a coil 108 disposed about a core member 106 of an electromagnetic connector 100. In this manner, communications between the backplane 114 and one or more modules 116 can be implemented in the manner of a passive hub 120. For example, the backplane 114 and the module 116 can communicate using multiple communications channels 122, each of which can be implemented using, for instance, a controller 124 (e.g., a microcontroller), as shown in FIG. 3. When a coil 108 disposed in the backplane 114 is energized, a signal is induced in each coil 108 associated with each communications channel 122 of the module 116. Further, when a coil 108 disposed in the module 116 is energized, a signal is induced in one or more coils 108 associated with the backplane 114. In this manner, communication is furnished between multiple controllers 124. In embodiments of the disclosure, two or more of the electrical circuits 118 are at least substantially identical (e.g., identical, electrically equivalent, and so forth) to provide redundancy within the backplane 114 and/or a module 116.

Figure 4:
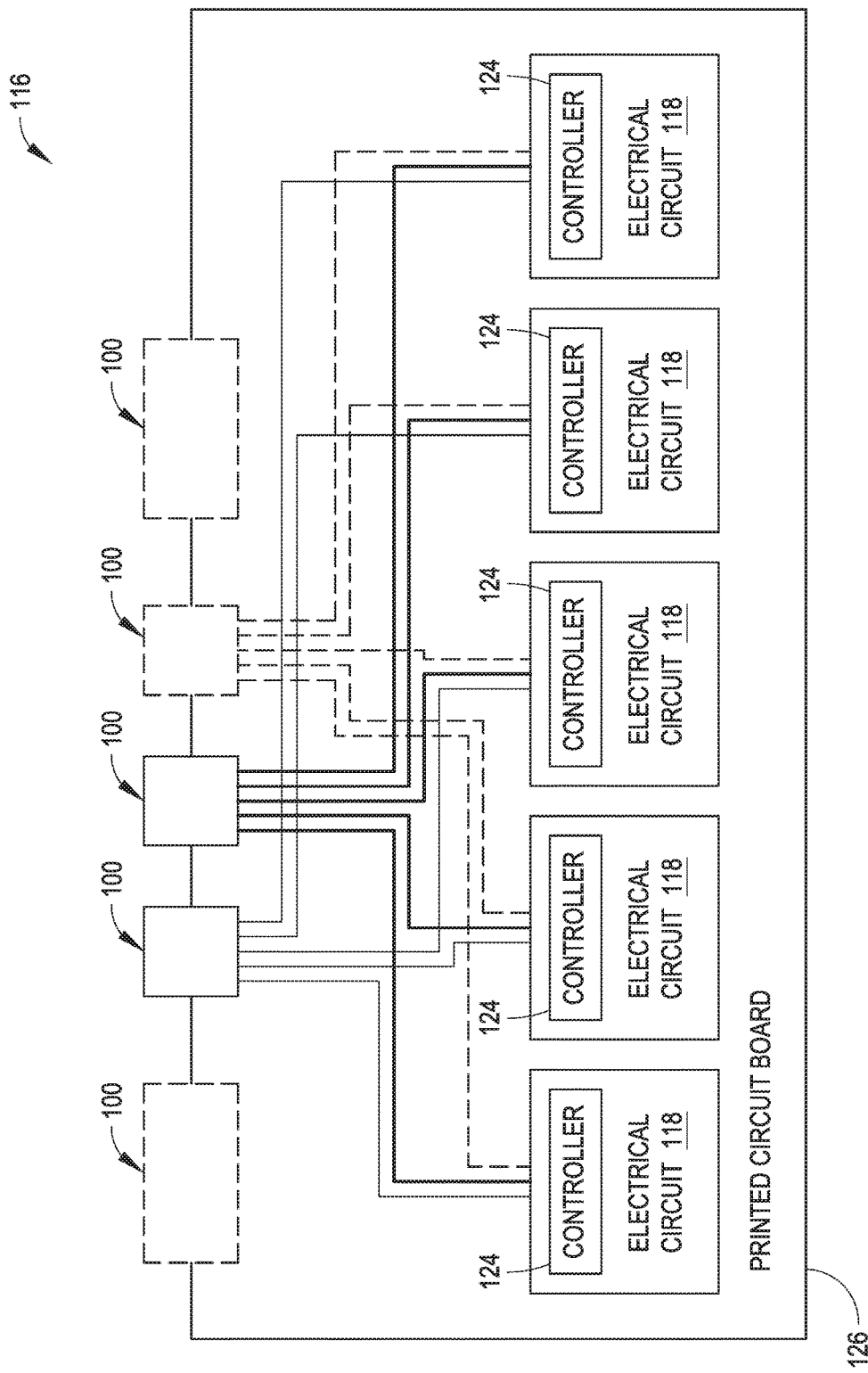
FIG. 4 is a partial diagrammatic illustration of a system including electrical circuits fabricated on a printed circuit board, where each one of the electrical circuits is separately connected to an electromagnetic connector supported by the printed circuit board, such as the electromagnetic connector illustrated in FIG. 2, in accordance with example embodiments of the present disclosure.
Figure 5B:
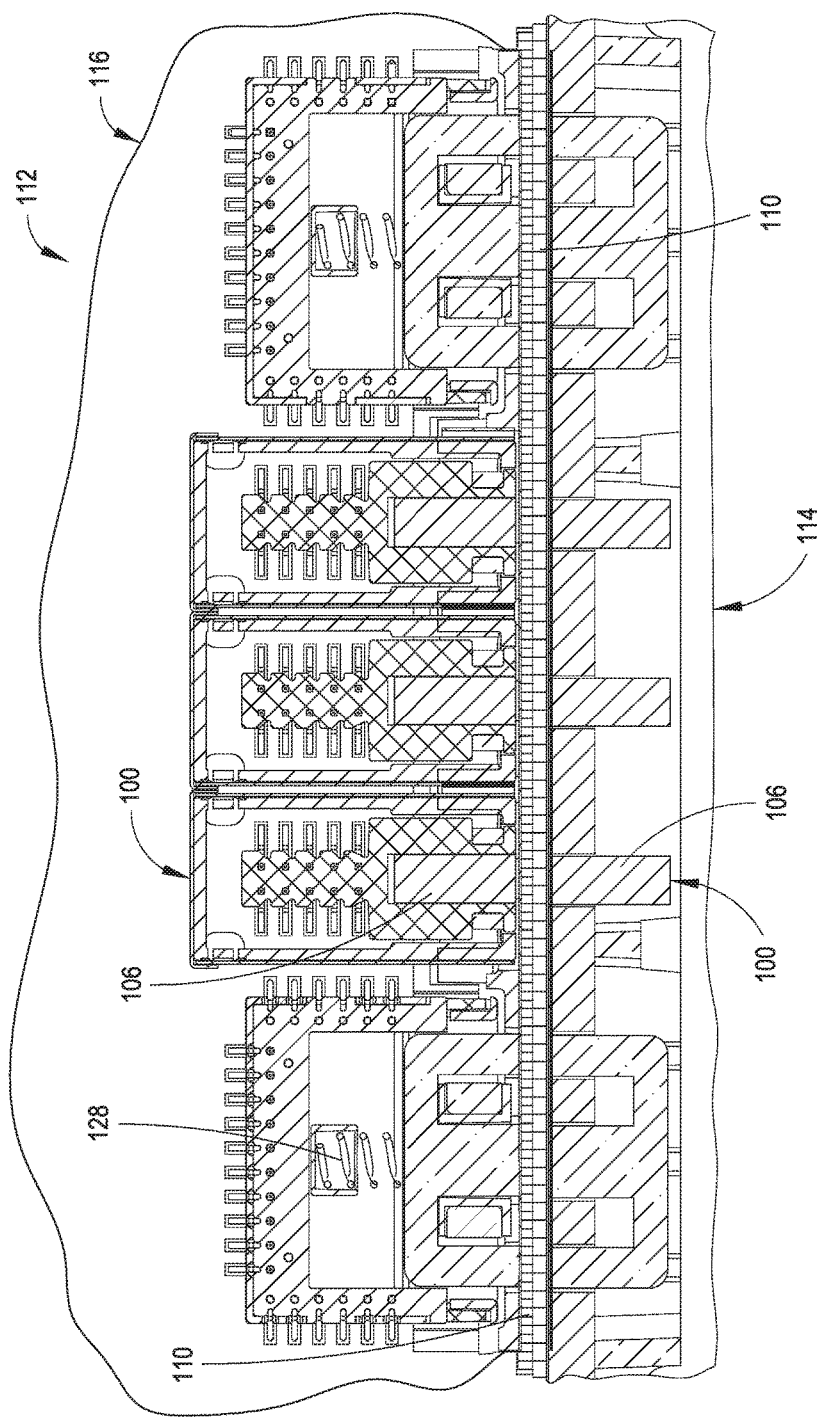
FIG. 5B is a partial cross-sectional end view of the system illustrated in FIG. 5A, where the electromagnetic connectors are mated to couple the module to the backplane.

In some implementations, the electrical circuits 118 are implemented in a single, monolithic printed circuit board (PCB) 126, e.g., with multiple I-shaped and/or E-shaped core members 106 and coils 108 of electromagnetic connectors 100 supported by the PCB 126, as shown in FIG. 4. In implementations, the core members can be mechanically isolated from the PCB 126 (e.g., not touching the PCB 126). However, this configuration is provided by way of example only and is not meant to be restrictive of the present disclosure. In some embodiments, one or more biasing members 128 (e.g., a spring) are included for biasing a core member 106, as shown in FIG. 5B. For example, in the illustrated embodiment, a core member 106 is biased towards another core member 106. However, in other embodiments, a core member 106 is biased away from another core member 106, biased into alignment with another core member 106, and so forth.

The system 112 can be configured for connecting one or more I/O modules 116 (e.g., as slave devices) and transmitting data to and from the I/O modules 116. The I/O modules 116 can comprise input modules, output modules, and/or input and output modules. For instance, input modules can be used to receive information from input instruments in the process or the field, while output modules can be used to transmit instructions to output instruments in the field. For example, an I/O module 116 can be connected to a process sensor, such as a sensor for measuring pressure in piping for a gas plant, a refinery, and so forth. In implementations, the I/O modules 116 can be used to collect data and control systems in applications including, but not necessarily limited to: industrial processes, such as manufacturing, production, power generation, fabrication, and refining; infrastructure processes, such as water treatment and distribution, wastewater collection and treatment, oil and gas pipelines, electrical power transmission and distribution, wind farms, and large communication systems; facility processes for buildings, airports, ships, and space stations (e.g., to monitor and control Heating, Ventilation, and Air Conditioning (HVAC) equipment and energy consumption), large campus industrial process plants, such as oil and gas, refining, chemical, pharmaceutical, food and beverage, water and wastewater, pulp and paper, utility power, mining, metals; and/or critical infrastructures.

In implementations, the I/O module 116 can be configured to convert analog data received from the sensor to digital data (e.g., using Analog-to-Digital Converter (ADC) circuitry, and so forth). An I/O module 116 can also be connected to a motor and configured to control one or more operating characteristics of the motor, such as motor speed, motor torque, and so forth. Further, the I/O module 116 can be configured to convert digital data to analog data for transmission to the motor (e.g., using Digital-to-Analog (DAC) circuitry, and so forth). In implementations, one or more of the I/O modules 116 can comprise a communications module configured for communicating via a communications sub-bus, such as an Ethernet bus, an H1 field bus, a Process Field Bus (PROFIBUS), a Highway Addressable Remote Transducer (HART) bus, a Modbus, and so forth. Further, two or more of the I/O modules 116 can be used to provide fault tolerant and redundant connections for a communications sub-bus.

Each I/O module 116 can be provided with a unique identifier (ID) for distinguishing one I/O module 116 from another I/O module 116. In implementations, an I/O module 116 can be identified by its ID when it is connected to the system 112. Multiple I/O modules 116 can be used with the system 112 to provide redundancy. For example, two or more I/O modules 116 can be connected to a sensor and/or a motor. Each 1/O module 116 can include one or more ports 130 furnishing a physical connection to hardware and circuitry included with the I/O module 116, such as the PCB 126, and so forth.

One or more of the I/O modules 116 can include an interface for connecting to other networks, including but not necessarily limited to: a wide-area cellular telephone network, such as a 3G cellular network, a 4G cellular network, or a Global System for Mobile communications (GSM) network; a wireless computer communications network, such as a Wi-Fi network (e.g., a Wireless LAN (WLAN) operated using IEEE 802.11 network standards); a Personal Area Network (PAN) (e.g., a Wireless PAN (WPAN) operated using IEEE 802.15 network standards); a Wide Area Network (WAN); an intranet; an extranet; an internet; the Internet; and so on. Further, one or more of the I/O modules 116 can include a connection for connecting an I/O module 116 to a computer bus, and so forth.

Data transmitted by the system 112 can be packetized, i.e., discrete portions of the data can be converted into data packets comprising the data portions along with network control information, and so forth. The system 112 can use one or more protocols for data transmission, including a bit-oriented synchronous data link layer protocol such as High-Level Data Link Control (HDLC). In a specific instance, the system 112 can implement HDLC according to an International Organization for Standardization (ISO) 13239 standard, or the like. Further, two or more systems 112 can be used to implement redundant HDLC. However, it should be noted that HDLC is provided by way of example only and is not meant to be restrictive of the present disclosure. Thus, the system 112 can use other various communications protocols in accordance with the present disclosure.

Referring now to FIGS. 5A and 5B, the backplane 114 and the module 116 include two (2) E-core connector assemblies 102 and three (3) I-core connector assemblies 102. The E-core connector assemblies 102 are substantially identical, where one serves as a primary source of power for the module 116 and the other serves as a backup source of power for the module 116. With reference to the three I-core connector assemblies 102, one provides high-frequency communication from the backplane 114 to the module 116, one provides high-speed communication from the module 116 to the backplane 114, and one provides relatively lower frequency bidirectional communication for monitoring and/or supervisory functions. As shown, each I-core electromagnetic connector 100 disposed in a module 116 has five (5) windings, with one (1) winding included with an I-core electromagnetic connector 100 disposed in the backplane 114. The I-core electromagnetic connectors 100 form connector assemblies 102 comprising multi-winding transformers with impedances balanced between the various loads. However, the use of two electromagnetic power transfer assemblies and three electromagnetic communication assemblies is provided by way of example only and is not meant to limit the present disclosure. In other embodiments, fewer or more such assemblies are provided.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. An electromagnetic connector configured to form a first magnetic circuit portion, the electromagnetic connector comprising:
    a first core member including at least one of a magnetic material, a ferromagnetic material, or a ferrimagnetic material; and
    a coil disposed about the first core member, the coil configured to connect to an electrical circuit, the electromagnetic connector configured to mate with a second electromagnetic connector, the second electromagnetic connector configured to form a second magnetic circuit portion, the second electromagnetic connector comprising a second core member and a plurality of coils disposed about the second core member, the first core member and the second core member configured to couple the plurality of coils to the coil with a magnetic circuit formed from the first magnetic circuit portion and the second magnetic circuit portion when the electromagnetic connector is mated with the second electromagnetic connector, the magnetic circuit configured to induce identical communications signals in a first coil of the plurality of coils and the coil when a second coil of the plurality of coils is energized.

2. The electromagnetic connector as recited in claim 1, wherein the electrical circuit is fabricated on a printed circuit board.

3. The electromagnetic connector as recited in claim 2, wherein the printed circuit board is configured to support the first core member and the coil.

4. The electromagnetic connector as recited in claim 1, further comprising at least one layer of material disposed of the first core member for separating the first core member from the second core member when the electromagnetic connector is mated with the second electromagnetic connector.

5. The electromagnetic connector as recited in claim 1, wherein the first core member comprises an I-shaped core member.

6. The electromagnetic connector as recited in claim 5, wherein the I-shaped core member is configured to mate with a second I-shaped core member.

7. A device comprising:
an electrical circuit; and
an electromagnetic connector configured to form a first magnetic circuit portion, the electromagnetic connector comprising a first core member and a coil disposed about the first core member, the first core member including at least one of a magnetic material, a ferromagnetic material, or a ferrimagnetic material, the coil configured to connect to the electrical circuit, the electromagnetic connector configured to mate with a second electromagnetic connector, the second electromagnetic connector configured to form a second magnetic circuit portion, the second electromagnetic connector comprising a second core member and a plurality of coils disposed about the second core member, the first core member and the second core member configured to couple the plurality of coils to the coil with a magnetic circuit formed from the first magnetic circuit portion and the second magnetic circuit portion when the electromagnetic connector is mated with the second electromagnetic connector, the magnetic circuit configured to induce identical communications signals in a first coil of the plurality of coils and the coil when a second coil of the plurality of coils is energized.

8. The device as recited in claim 7, further comprising a printed circuit board, wherein the electrical circuit is fabricated on the printed circuit board.

9. The device as recited in claim 8, wherein the printed circuit board is configured to support the first core member and the coil.

10. The device as recited in claim 7, further comprising at least one layer of material disposed of at least one of the first core member or the second core member for separating the first core member from the second core member when the first electromagnetic connector is mated with the second electromagnetic connector.

11. The device as recited in claim 7, wherein at least one of the first core member or the second core member comprises an I-shaped core member.

12. The device as recited in claim 11, wherein at least the other one of the at least one of the first core member or the second core member comprises a second I-shaped core member configured to mate with the I-shaped core member.

13. An industrial control system comprising:
an industrial element comprising a plurality of electrical circuits and a first electromagnetic connector configured to form a first magnetic circuit portion, the first electromagnetic connector comprising a first core member and at least one coil disposed about the first core member, the at least one coil configured to connect to an electrical circuit;
a backplane comprising a second electromagnetic connector, the second electromagnetic connector configured to form a second magnetic circuit portion, the second electromagnetic connector comprising a second core member and at least one coil disposed about the second core member; and
a hub formed by mating the first electromagnetic connector with the second electromagnetic connector, the first core member and the second core member configured to couple the at least one coil of the industrial element to the at least one coil of the backplane with a magnetic circuit formed from the first magnetic circuit portion and the second magnetic circuit portion when the first electromagnetic connector is mated with the second electromagnetic connector, at least one of the at least one coil of the industrial element or the at least one coil of the backplane comprising a second coil, the magnetic circuit configured to induce identical signals in the at least one coil of the industrial element and the at least one coil of the backplane when the second coil is energized.

14. The industrial control system as recited in claim 13, further comprising a printed circuit board, wherein the electrical circuit is fabricated on the printed circuit board.

15. The industrial control system as recited in claim 14, wherein the printed circuit board is configured to support the first core member and the at least one coil of the industrial element.

16. The industrial control system as recited in claim 13, further comprising at least one layer of material disposed of at least one of the first core member or the second core member for separating the first core member from the second core member when the first electromagnetic connector is mated with the second electromagnetic connector.

17. The industrial control system as recited in claim 13, wherein at least one of the first core member or the second core member comprises an I-shaped core member.

18. The industrial control system as recited in claim 17, wherein at least the other one of the at least one of the first core member or the second core member comprises a second I-shaped core member configured to mate with the I-shaped core member.

* * * * *